United States Patent
Aftab et al.

(10) Patent No.: US 11,743,790 B2
(45) Date of Patent: *Aug. 29, 2023

(54) 5G AND SDN POWERED VIRTUALIZED PERSONAL DEVICE FRAMEWORK

(71) Applicant: AT&T Intellectual Property I, L.P., Atlanta, GA (US)

(72) Inventors: Syed Anwar Aftab, Budd Lake, NJ (US); John Murray, Denville, NJ (US); Mazin Gilbert, Warren, NJ (US); Manoop Talasila, Somerset, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,964

(22) Filed: Apr. 25, 2022

(65) Prior Publication Data

US 2022/0256419 A1 Aug. 11, 2022

Related U.S. Application Data

(63) Continuation of application No. 16/538,529, filed on Aug. 12, 2019, now Pat. No. 11,343,740.

(51) Int. Cl.
H04W 36/12 (2009.01)
H04W 88/06 (2009.01)
H04W 4/90 (2018.01)
H04W 4/02 (2018.01)
G06F 9/455 (2018.01)

(52) U.S. Cl.
CPC ........ *H04W 36/12* (2013.01); *G06F 9/45558* (2013.01); *H04W 4/025* (2013.01); *H04W 4/90* (2018.02); *H04W 88/06* (2013.01); *G06F 2009/45595* (2013.01)

(58) Field of Classification Search
CPC ....... H04W 36/12; H04W 4/90; H04W 4/025; H04W 88/06; G06F 9/45558; G06F 2009/45595
USPC .......................................................... 370/331
See application file for complete search history.

(56) References Cited

U.S. PATENT DOCUMENTS

| | | |
|---|---|---|
| 2016/0132310 A1 | 5/2016 | Koushik et al. |
| 2016/0150575 A1 | 5/2016 | Andersen et al. |
| 2018/0285977 A1 | 10/2018 | Cleary et al. |
| 2019/0058656 A1 | 2/2019 | Gundersen et al. |
| 2019/0174366 A1 | 6/2019 | Susitaival et al. |
| 2019/0372837 A1 | 12/2019 | Yang et al. |

*Primary Examiner* — Gbemileke J Onamuti
(74) *Attorney, Agent, or Firm* — GUNTIN & GUST, PLC; Matthew Tropper

(57) ABSTRACT

A system may allow for generic end user mobile devices to be operated using a virtualized personal device framework. The virtualized personal device framework may provide for a collective intelligence network platform that allows offloading of heavy computing processes onto virtual instance in a cloud network and enables crowd sourcing services for smart cities that may provide smart emergency services in which end-users collaborate.

20 Claims, 7 Drawing Sheets

5G AND SDN POWERED VIRTUALIZED PERSONAL DEVICE FRAMEWORK

CROSS REFERENCE TO RELATED APPLICATIONS

This application is a continuation of U.S. patent application Ser. No. 16/538,529 filed on Aug. 12, 2019. All sections of the aforementioned application are incorporated herein by reference in their entirety.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. With the use of general purpose hardware, the operation and management of service provider networks may be improved. This disclosure is directed to addressing issues in the existing technology.

SUMMARY

A system may allow for generic end user mobile devices to be operated using a virtualized personal device framework. The virtualized personal device framework may provide for a collective intelligence network platform that allows offloading of heavy computing processes onto virtual instance in a cloud network and also enables crowd sourcing services for smart cities that may provide smart emergency services in which end-users collaborate.

In an example, an apparatus may include a processor and a memory coupled with the processor that effectuates operations. The operations may include obtaining an indication of a login of a user associated with a first mobile device; based on the indication of the login, determining a first virtualized state for the first mobile device; transferring, based on information associated with the first mobile device, the first virtualized state for the mobile device to a first edge cloud network; and providing instructions to operate the first virtualized state based on a graphical user interface of the first mobile device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
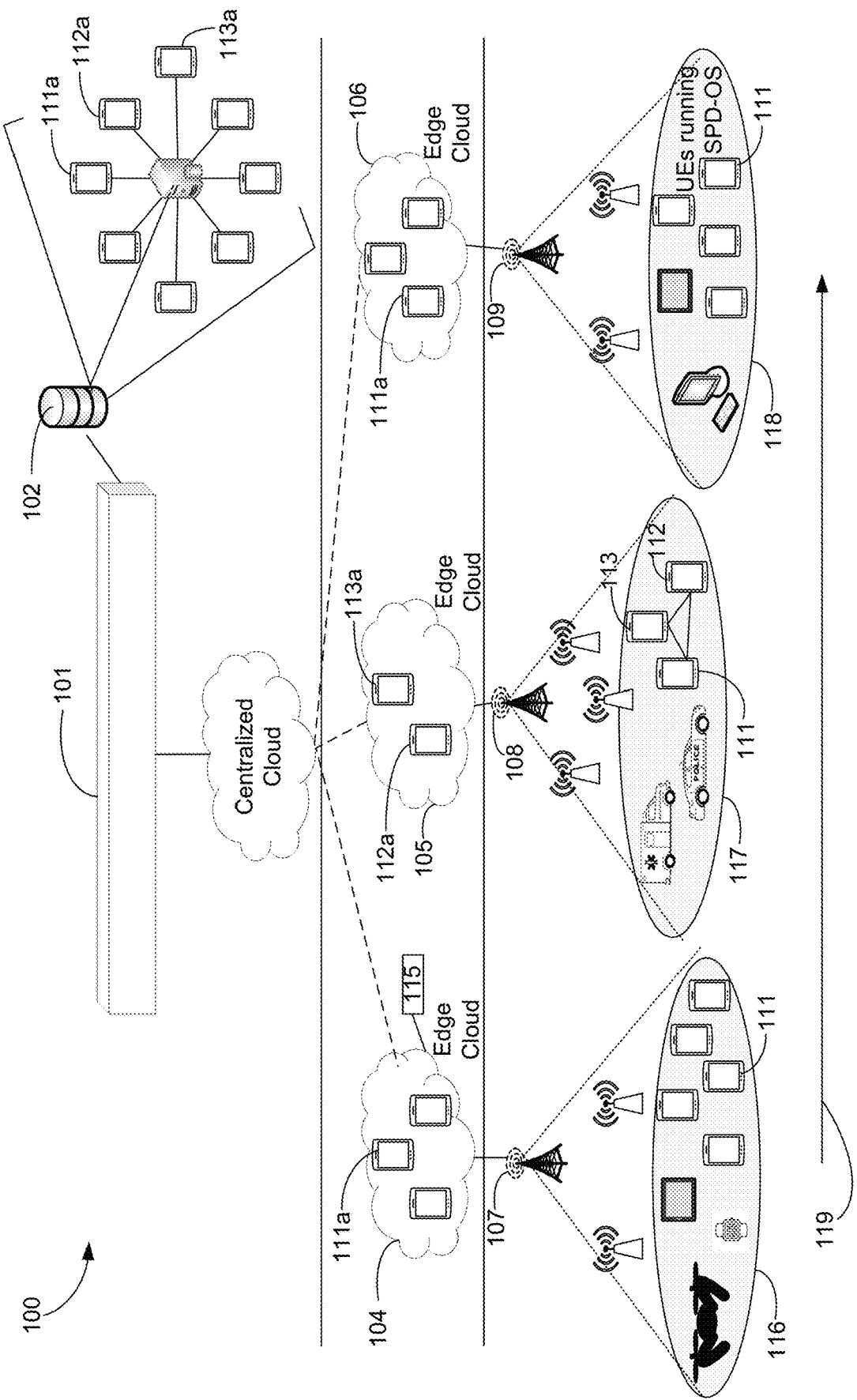
FIG. 1 illustrates an exemplary system for 5G and SDN powered virtualized personal device framework.

FIG. 1 illustrates an exemplary system for 5G and SDN powered virtualized personal device framework. System 100 may include server 101, repository 102, edge cloud 104, edge cloud 105, edge cloud 106, base station 107, base station 108, base station 109, mobile device 111, mobile device 112, or mobile device 113, which may be communicatively connected with each other. Server 101 may help manage the virtualized personal device framework. For example, server 101 may receive information about end devices (e.g., mobile device 111) and appropriately provide instructions for the creation, update, movement, or deletion of virtual instances (e.g., virtual machines) based on information (e.g., sensor information or one or more factors). Example virtual instances include SDN powered personal device (SPPD) state 111a, SPPD state 112a, or SPPD state 113a. Repository 102 may include SPPD states associated with a particular user. SPPD states may be virtual instances that can be instantiated and ready to be pushed to edge cloud 104, edge cloud 105, or edge cloud 106.

As provided in more detail herein, based on the scenario, SPPD state 111a may be located in edge cloud 104 or edge cloud 106, while SPPD state 112a and SPPD state 113a are located in edge cloud 105. Base station 107, base station 108, base station 109 may have radio coverage that overlaps (or not) coverage areas that include mobile devices associated with particular users, such as mobile device 111, mobile device 112, or mobile device 113. An SPPD may be mobile device 111. An SPPD may include an unmanned vehicle (e.g., land, water, or air drone), a connected automobile (e.g., autonomous car), tablet, watch, laptop, or mobile phone, among other things. As considered in more detail herein, arrow 119 indicates a possible direction of travel from one or more mobile devices.

Figure 2:
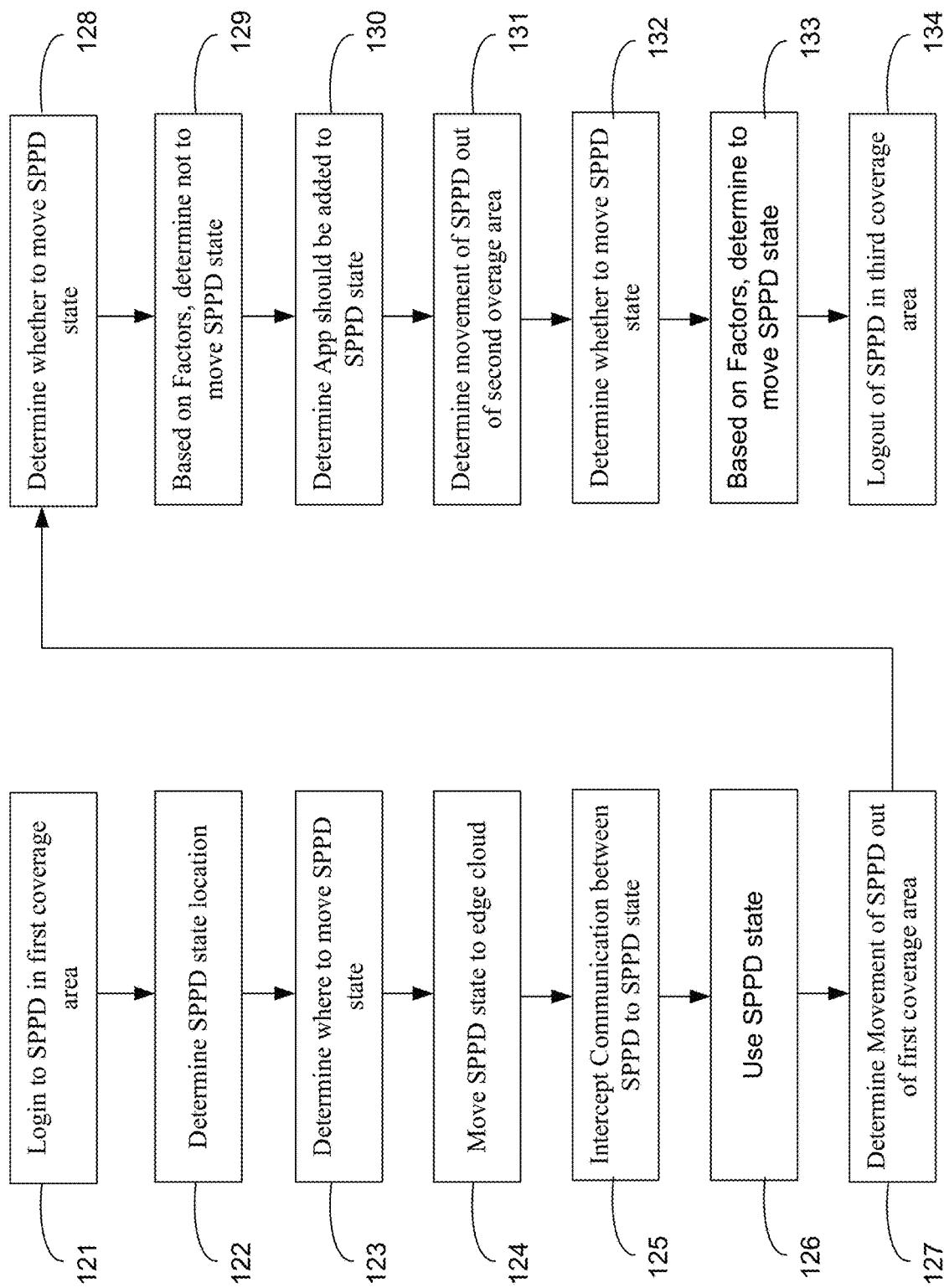
FIG. 2 illustrates an exemplary method that may be implemented in a 5G and SDN powered virtualized personal device framework.

FIG. 2 illustrates an exemplary method that may be implemented in a 5G and SDN powered virtualized personal device framework. At step 121, a user may log into mobile device 111 (e.g., SPPD 111) at some time period t0. At time period t0, mobile device 111 may be serviced with coverage area 116 by base station 107. Logging into a mobile device 111 may be done using a text username and password, fingerprint scanning, facial recognition, or voice recognition, among other biometric authentications or non-biometric authentications. Mobile device 111 may be a physical generic device running an SDN Personal Device Operating System (SPD-OS) that may support physical hardware, such as a camera, WiFi, Bluetooth, or wide area network radios (e.g., 5G or LTE) for network connectivity. In addition, mobile device 111 may include sensors like GPS, accelerometers, gyroscopes, magnetometers, compasses, or the like. The end-user may simply login using an assigned network ID, for example, and may access the network services from any generic device that supports virtual device communication disclosed herein. Mobile device 111 may include mobile phones, tablet, smart watches, or internet of things (IoT) devices like healthcare body wearables. In the example of a mobile phone for mobile device 111, the mobile phone may have a graphical user interface that displays a plurality of Apps, but the virtualized instance of the mobile phone may be used for the storage or predominate execution of the Apps.

At step 122, based on the login of step 121, a determination may be made whether SPPD state 111a (which is the virtual instance of mobile device 111) is located at the edge cloud (also referred herein as edge cloud network) that covers coverage area 116. This determination may be made by server 101. Server 101 may manage the 5G and SDN powered virtualized personal device framework. So, in response to the login of step 121, server 101 may receive a message from mobile device 111 that is for a request to utilize SPPD state 111a. At step 123, server 101, for example, may determine that SPPD state 111a is not on an edge cloud, therefore server 101 may determine which edge cloud to move SPPD state 111a to. Determining which edge cloud to move SPPD state 111a may be based on information, such as location (e.g., closest edge cloud to mobile device 111), current utilization (e.g., throughput) associated with edge cloud 104, current latency associated with edge cloud 104, predicted utilization associated with edge cloud 104, predicted latency associated with edge cloud 104, time of use of mobile device 111 within a coverage area, predicted movement of mobile device 111, latency sensitivity of applications associated with mobile device 111 (e.g., above threshold percentage may determine which edge cloud), or information from sensors of mobile device 111, among other things.

With continued reference to FIG. 2, it is contemplated that the information may be related to the particular needs of the applications of SPPD state 111a or the network path used to implement the services associated with the application. In an example scenario, server 101, based on historical information (e.g., information associated with mobile device 111, SPPD states of edge cloud 104, or base station 107), may determine that SPPD state 111a should proactively move to edge cloud 105 because it is likely mobile device 111 will move into coverage area 117 with a threshold period of time (e.g., 50 seconds). The triggers associated with the information may be based on a numerical value (e.g., number of SPPD states in an edge cloud), threshold percentage (e.g., percentage of SPPD states with a first application), or the like.

At step 124, based on step 123 (e.g., selecting edge cloud 104), server 101 may move SPPD state 111a in repository 102 to edge cloud 104. Edge cloud 104 may have a plurality of whiteboxes located within it. Whiteboxes are considered programmable in a way that allows the programmer to adapt and implement according to a specific network (e.g., ISP network) and not limited to a predefined set of functionalities. SPPD state 111a may be a virtual instance of mobile device 111. Mobile device 111 may be a generic mobile device with basic processing or storage. Mobile device 111 may include a user interface that communicates with SPPD state 111a. At step 125, subsequent to moving SPPD state 111a to edge cloud 104, communications from mobile device 111 may be intercepted and relayed to SPPD state 111a, which may be based on an identifier of mobile device 111. Mobile device 111 may not need to know where SPPD state 111a is located. In another scenario, an indication may be sent to mobile device 111 that SPPD state 111a is located at edge cloud 104 (e.g., server 115 located within edge cloud 104).

At step 126, mobile device 111 while in coverage area 116 may use SPPD state 111a while in edge cloud 104. At step 127, at time period t1, server 101 may determine that mobile device 111 moved to coverage area 117 which is usually serviced by base station 108 and edge cloud 105. At step 128, based on the determination of step 127, server 101 may determine whether to move SPPD state 111a to edge cloud 105 from edge cloud 104 based on factors, such as reaching a threshold utilization (e.g., processor or memory) for servers within edge cloud 105. At step 129, based on the determination of step 128, server 101 may determine to keep SPPD state 111a in edge cloud 104 during time period t1.

At step 130, based on information, determine that applications should be added to SPPD state 111a when mobile device is in coverage area 117. For example, there may be a determination that friends of the user associated with mobile device 111 are also located in coverage area 117. These friends may be associated with mobile device 112 and mobile device 113, which have corresponding SPPD state 112a and SPPD state 113a in edge cloud 105. Information may include number of friends in an area, location of friends, within range of sensors of physical mobile devices, the types of Apps used in the past or other information, which may be historical. In this example, SPPD state 112a and SPPD state 113a may have a game app that SPPD state 111a does not have. Therefore, the game app may be automatically added to SPPD state 111a. Friends (or other grouping) may be automatically selected based on information or selected by a user. Although, a scenario with "friends" is mentioned, it is contemplated that the scenario may be applicable to installation of applications that are used to implement business needs in view of the various types of mobile devices.

With continued reference to FIG. 2, at step 131, at time period t2, server 101 may determine that mobile device 111 moved to coverage area 118 which is usually serviced by base station 109 and edge cloud 106. At step 132, based on the determination of step 131, server 101 may determine whether to move SPPD state 111a to edge cloud 106 from edge cloud 105 based on information, as disclosed herein. At step 129, based on the determination of step 132, server 101 may determine to copy SPPD state 111a in edge cloud 104 during time period t2 to edge cloud 106. Server 101 may place the copy of SPPD state 111a of edge cloud 104 in an inert mode that is continuously updated and put SPPD state 111a in edge cloud 106 in an active mode. This may be done, for example, based on information such as the historical travel and use patterns of mobile device 111, and server 101 may find the aforementioned setup more efficient. At step 134, at time period t3, the user of mobile device 111 may logout and SPPD state 111a may be deleted from the edge clouds. A new user may use mobile device 111 and have their own SPPD state 111b (not shown). It is contemplated that the disclosed system may allow for easy rental of mobile devices and reduce the need for vendor specific mobile devices.

Figure 3:
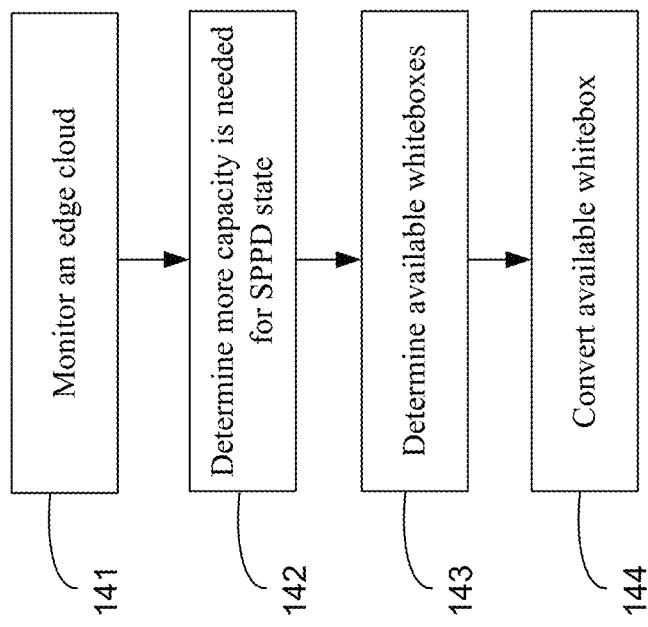
FIG. 3 illustrates an exemplary method that may be implemented in a 5G and SDN powered virtualized personal device framework.

FIG. 3 illustrates another exemplary method that may be implemented in a 5G and SDN powered virtualized personal device framework. At step 141, server 101 may monitor edge cloud 104. At step 142, responsive to the monitoring of step 141, server 101 may determine, based on factors, that more capacity is needed for SPPD state 111a. In an example, reaching a threshold of 70% utilization of edge cloud 104 may be a factor that indicates that more capacity is needed. At step 143, based on determining that more capacity is needed, there may be a determination of whether whiteboxes are available to be converted for use in whole or in part for use in storing or implementing SPPD states. At step 144, based on determining that server 115 is available in edge cloud 104, server 115 may be converted from a first configuration (e.g., network router) to a device that houses SPPD states. The use of such a system may help reduce the likelihood of performance issues and reduce the need to increase the number of devices in the network.

In view of FIG. 3, collective intelligence may exist because of user's usage of Apps directly in the network cloud. A service provider may now have more intelligent responses in which to improve the services in more real-time. A service provider may more efficiently detect or predict failures that may significantly impact a user and heal the network based on the disclosed virtualized instances. In an example scenario, a user of mobile device 111 may use a map based application via SPPD state 111a. The map application may require location, time, or context information (e.g., in mall or movie theater). During this time, a network service may be have abnormally high network traffic at the coverage area 116, the location in which mobile device uses the map application. Based on the abnormally high network traffic, server 101 may obtain an indication that the service provider is giving a delayed response to mobile device 111 or other users in coverage area 116. For additional context, it may be that mobile device 111 is close to a sports location in which a game is going on and the use of the map application may be near the end of the game. The service provider may know that most users use certain Apps (e.g., map App) during the end of a sporting event, such as for car parking or restaurants. Once the network gets to a threshold, such as 70% of utilization, alarms may be triggered.

Further, based on the alarms, another service may be triggered in which the network may convert an existing whitebox (which may have currently been a switch or a router or another useful network device). So the network may automatically detect a scenario in which a network condition should happen that usually lead to failures, and before that happens the network (e.g., server 101) may determine a way to mitigate the failure by converting an existing whitebox (also referred to herein as a whitebox device) into an appropriate SPPD state handling device so it may address the service requests at a better rate. The virtualization of mobile device 111 (e.g., SPPD state 111a) may play a significant role at the very beginning. When the network detects the 70%, it may have detected based on the virtual devices running in the edge cloud. The service provider can determine the state of the services (e.g., how many of the same App is being used) being offered and the data that is being transferred to the devices and prediction of what the utilization will grow to. The system may be efficient in actually understanding the service(s) that are causing the issue and more efficiently respond to such information. So instead of getting a general report of more data traffic that is conventionally done, the disclosed subject matter ma allow for more granular reporting and proactive action.

For additional perspective, SPPD may allow for cost-effective generic end user mobile devices that may replace the conventional vendor specific mobile devices. In addition, the supporting 5G and SDN powered virtualized personal device framework may provide for a collective intelligence network platform which allows offloading of heavy computing processes onto its virtual instance on the cloud by leveraging the 5G low latency. Such a 5G and SDN powered virtualized personal device framework may enable crowd sourcing services for smart cities to provide smart emergency services where end-users collaborate. Using a conventional framework a system could be implemented to use multiple crowd sourcing apps which may ask the mobile phone for the same data, which may consume battery power at a fast rate. Using the disclosed virtualized personal device framework, the sensor data of the mobile phone may be generically gathered and a single system can process the data and provide meaningful context for crowd sourcing-type emergency services and scalability.

5G and SDN powered virtualized personal device framework enables the creation of virtual instances of user mobile devices and may replace conventional vendor specific smartphones, tablets, or the like, with generic mobile devices (e.g., mobile whiteboxes) with basic processing and storage and running an SPD-OS that accommodates the basic processing and storage. As disclosed, a substantial amount of the applications (e.g., about 80% or more of the applications) may be stored in the cloud and implemented in the SPPD state, while minimal applications (e.g., base sensor functionality software or the like) may be stored and implemented on the physical mobile device. This virtualization may help offload the process intensive computations like machine learning computations on huge datasets onto the virtual instance on the network cloud. This may allow network provider markets to be expanded across the world with less costs due to the generic device and may more efficiently scale the services to the large markets as the devices are virtually maintained in the network cloud. The resources required for the markets may be isolated in the network cloud in a distributed fashion and may save cost for the network provider based on their usage. The generic mobile devices may simplify the overall end-user experience (e.g., a user may easily switch or swap the generic multiple devices as necessary) and may allow the network provider easier business market penetration due to less complications based on the physical device being generic.

5G and SDN powered virtualized personal device framework enables crowd applications, analytics and services through collaboration. 5G and SDN powered virtualized personal device framework enables mobile device to mobile device communications among their virtual devices in the cloud which may reduce the load on the overall network hops or bandwidth which may lead to cost savings for a service provider and ultra-fast services to an end user. 5G and SDN powered virtualized personal device framework enables smart cities transportation use case like transportation data collected to provide traffic services to the users in the smart cities enabled with 5G.

SDN Powered Personal Device may reduce the high processing power demand and high storage needed on the end user mobile devices. The mobile OS (e.g., SPD-OS) in virtual personal device may be run so that the existing app stores can be used to access the wide range of apps with minimal (or no) modifications by the app developers. The apps may be downloaded from any supported third-party app store and installed directly on the virtual device in the cloud. The user's virtual instance may be pushed to the edge cloud closest to the end user to meet the latency requirements of the future ultra-fast networks. These virtual devices (e.g., SPPD state 111a) may be hosted in distributed cloud environment where the mobile device apps may take advantage of the distributed nature, such as processing or storing the data required by the apps in a distributed manner. The functions of server 101, repository 102, and other servers may be distributed. Edge clouds may include several whiteboxes (e.g., general purpose hardware). An edge cloud may include servers and be a network in close proximity to the last mile network. An edge cloud may be a distributed micro-cloud system in which the computationally intensive tasks such as game simulation and rendering may be offloaded. The edge cloud may be a few hops (most of the time one or two hops) away from the mobile client, which may assist to meet the response time constraints of applications, such as for real-time gaming or the like.

Figure 4:
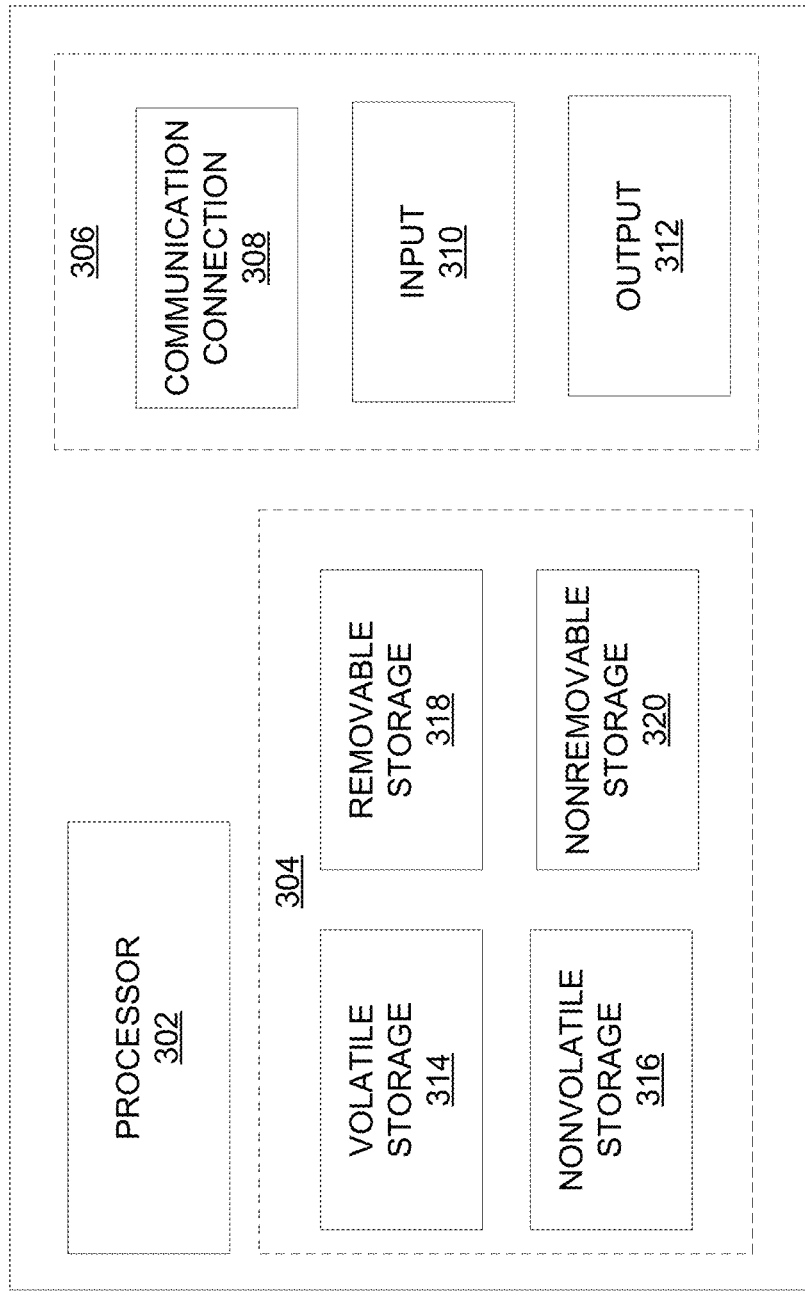
FIG. 4 illustrates a schematic of an exemplary network device.

FIG. 4 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
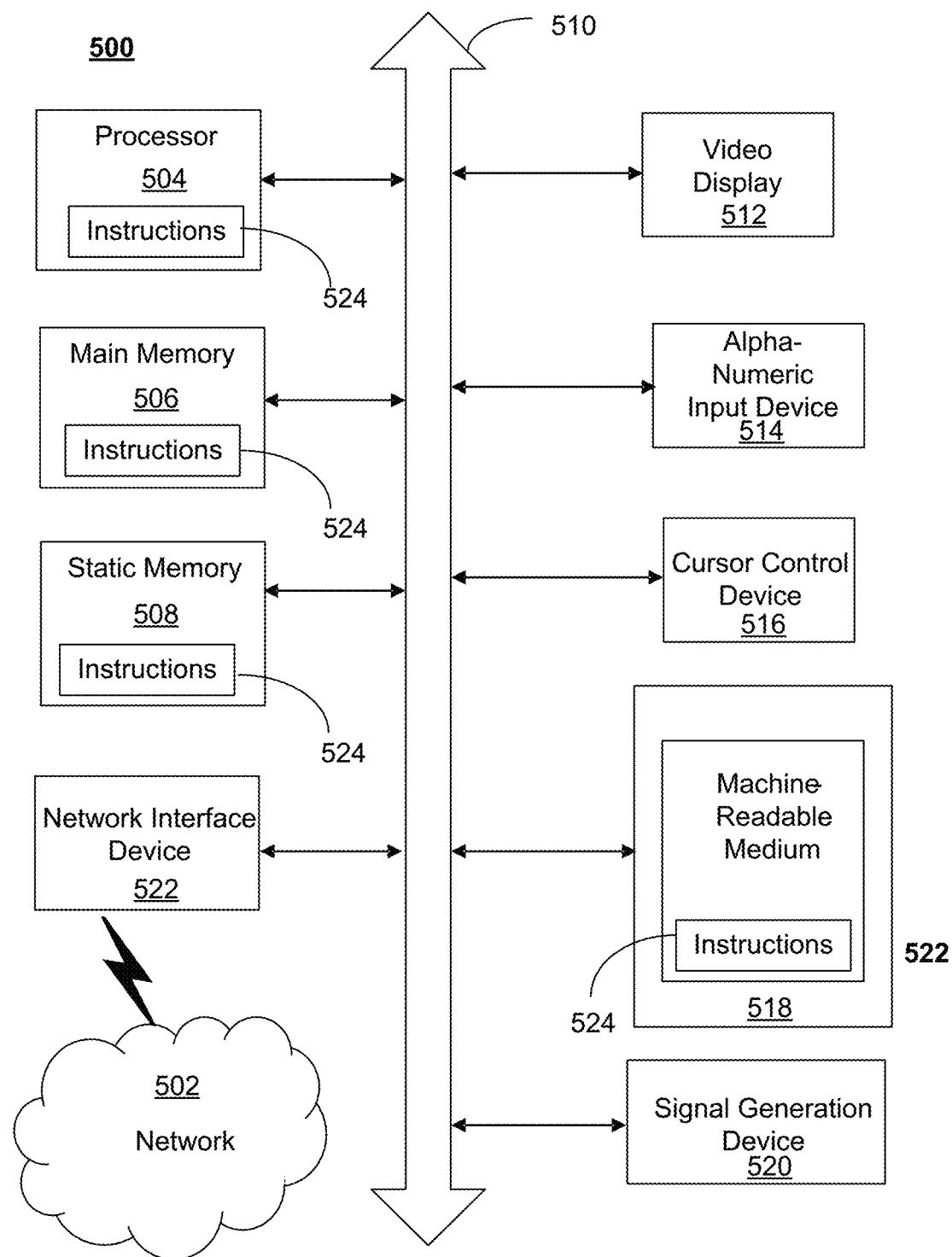
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 111, mobile device 112, server 101, repository 102, or other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6A:
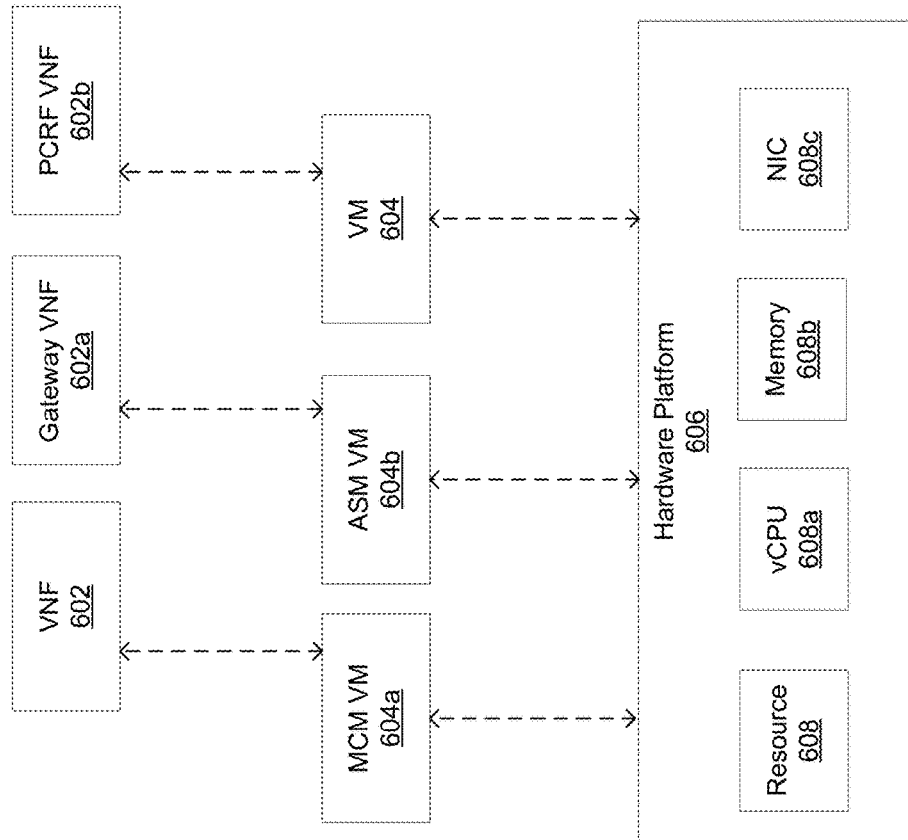
FIG. 6A is a representation of an exemplary network.

FIG. 6A is a representation of an exemplary network 600. Network 600 (e.g., system 100) may include an SDN. For example, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 6A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 6A illustrates a management control module (MCM) VM 604a and an advanced services module (ASM) VM 604b. Additionally or alternatively, VMs 604 may include other types of VMs, such as a DEP VM (not shown). Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 6B:
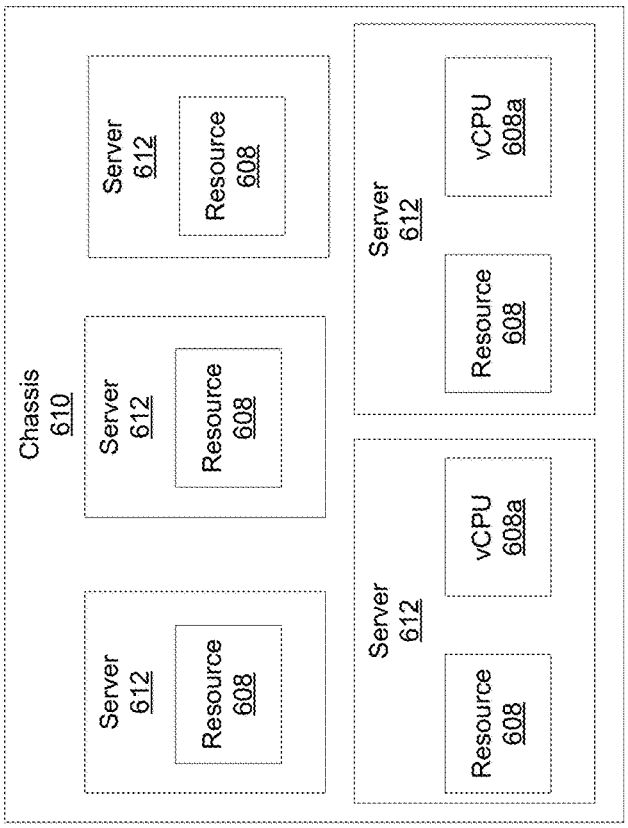
FIG. 6B is a representation of an exemplary hardware platform for a network.
Figure 6B:
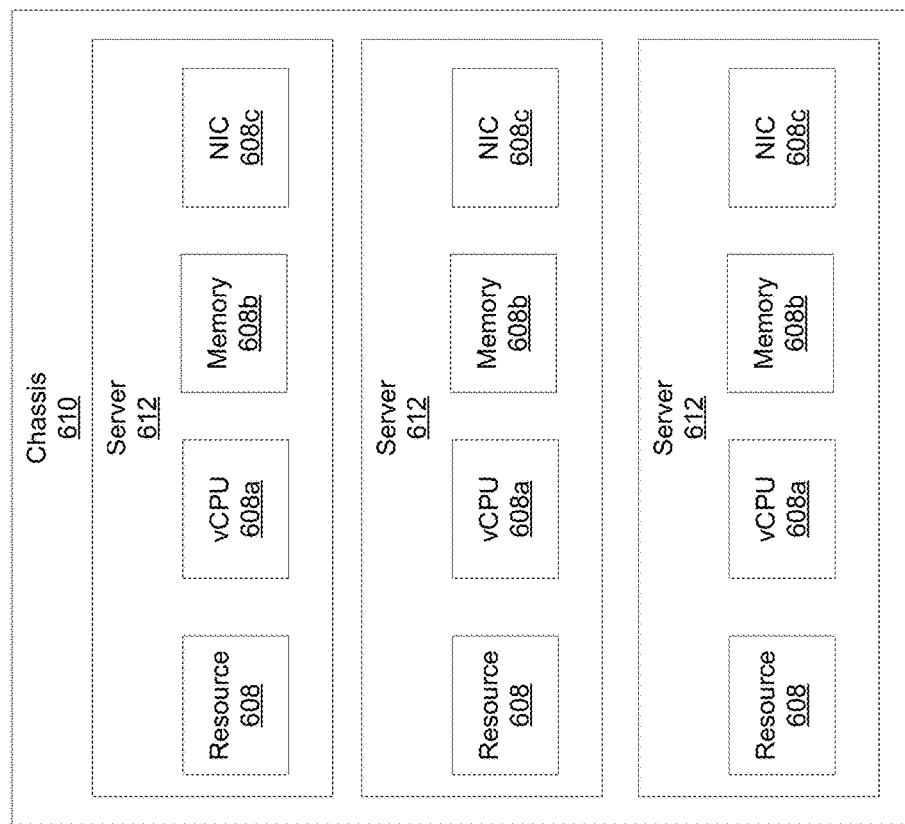

While FIG. 6A illustrates resources 608 as collectively contained in hardware platform 606, the configuration of hardware platform 606 may isolate, for example, certain memory 608c from other memory 608c. FIG. 6B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 6B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have enough resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which 5G and SDN powered virtualized personal device messages can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—5G and SDN powered virtualized personal device framework—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for 5G and SDN powered virtualized personal device framework. A method, system, computer readable storage medium, or apparatus provides for obtaining an indication of a login of a user associated with a first mobile device (e.g., a mobile phone); based on the indication of the login, determining a first virtualized state for the first mobile device; based on information associated with the first mobile device, transferring the first virtualized state for the mobile device to a first edge cloud network; and providing instructions to operate the first virtualized state based on a graphical user interface of the first mobile device. The information may include sensor information, location information, accelerometer information, latency, or other factors. The first edge cloud network may be determined based on proximity of the first edge cloud network to the first mobile device. A method, system, computer readable storage medium, or apparatus may transfer (e.g., handover) the first virtualized state to a second edge cloud based on utilization information of the first edge cloud network. A method, system, computer readable storage medium, or apparatus may provide for, based on the transferring of the first virtualized state for the mobile device to the first edge cloud network, converting a whitebox device with a first functionality (e.g., a router or a switch) to a whitebox device with a second functionality (e.g., a server for SPPD states), wherein the whitebox device may be in the first edge cloud network, and wherein the second functionality accommodates the operation of the first virtualized state for the first mobile device. A method, system, computer readable storage medium, or apparatus may monitor the movements of the first mobile device and update (or determine whether an update is needed) the location of the first virtualized state (e.g., in different edge cloud networks) based on the movements of the first mobile deice. The information may include crowd sourced information (e.g., location, accelerometer, gyroscope, error, mobile devices running the same applications, etc.) of the proximate mobile devices (e.g., mobile devices in a coverage area or nearby coverage areas). Although transferring is disclosed, generating, updating, or deleting the first virtualized state is contemplated. All combinations in this paragraph (including the removal or addition of steps) are contemplated in a manner that is consistent with the other portions of the detailed description.

What is claimed:
1. A device comprising:
a processing system including a processor; and
a memory that stores executable instructions that, when executed by the device, facilitate performance of operations, the operations comprising:
determining that a mobile device is communicatively coupled to a first edge network device and determining that the mobile device is communicatively coupled to a second edge network device;
identifying a group of applications running on the mobile device;
generating a first virtualized instance including a first group of virtualized applications associated with the group of applications on the first edge network device in response to determining a first latency associated with the first edge network device is less than a latency threshold;
providing instructions to operate the first group of virtualized applications on the first virtualized instance on the first edge network device;
generating a second virtualized instance including a second group of virtualized applications associated with the group of applications on the second edge network device in response to determining a second latency associated with the second edge network device is less than the latency threshold; and
providing instructions to operate the second group of virtualized applications on the second virtualized instance on the second edge network device.

2. The device of claim 1, wherein the operations comprise determining that the second latency is less than the first latency resulting in a first determination, wherein the generating of the second virtualized instance comprises generating the second virtualized instance based on the first determination.

3. The device of claim 2, wherein the providing of the instructions to operate the second group of virtualized applications on the second virtualized instance on the second edge network device comprises providing the instructions to operate the second group of virtualized applications on the second virtualized instance on the second edge network device based on the first determination.

4. The device of claim 1, wherein the first edge network device is associated with a first base station, wherein the first base station is associated with a first coverage area, wherein the second edge network device is associated with a second base station, wherein the second base station is associated with a second coverage area.

5. The device of claim 4, wherein the operations comprise determining that the mobile device has moved from the first coverage area into the second coverage area resulting in a second determination, wherein the providing of the instructions to operate the second group of virtualized applications on the second virtualized instance on the second edge network device comprises providing the instructions to operate the second group of virtualized applications on the second virtualized instance on the second edge network device based on the second determination.

6. The device of claim 4, wherein the operations comprise determining that the mobile device is located in both the first coverage area and the second coverage area resulting in a third determination, wherein the providing of the instructions to operate the second group of virtualized applications on the second virtualized instance on the second edge network device comprises providing the instructions to operate the second group of virtualized applications on the second virtualized instance on the second edge network device based on the third determination.

7. The device of claim 1, wherein the operations comprise obtaining information from the mobile device to determine a location of the mobile device.

8. The device of claim 7, wherein the information comprises one of sensor information, location information, accelerometer information, or a combination thereof.

9. The device of claim 1, wherein the operations comprise:
   determining a first utilization of a first edge network associated with the first edge network device;
   determining a second utilization of a second network associated with the second edge network device; and
   determining that the first utilization is above a utilization threshold and determining that the second utilization is below the utilization threshold resulting in a fourth determination, wherein the providing of the instructions to operate the second group of virtualized applications on the second virtualized instance on the second edge network device comprises providing the instructions to operate the second group of virtualized applications on the second virtualized instance on the second edge network device based on the fourth determination.

10. A non-transitory, machine-readable medium, comprising executable instructions that, when executed by a processing system including a processor, facilitate performance of operations, the operations comprising:
   determining that a mobile device is communicatively coupled to a first edge network device and determining that the mobile device is communicatively coupled to a second edge network device;
   identifying a group of applications running on the mobile device;
   generating a first virtualized instance including a first group of virtualized applications associated with the group of applications on the first edge network device in response to determining a first utilization associated with the first edge network device is less than a utilization threshold;
   providing instructions to operate the first group of virtualized applications on the first virtualized instance on the first edge network device;
   generating a second virtualized instance including a second group of virtualized applications associated with the group of applications on the second edge network device in response to determining a second utilization associated with the second edge network device is less than the utilization threshold; and
   providing instructions to operate the second group of virtualized applications on the second virtualized instance on the second edge network device.

11. The non-transitory, machine-readable medium of claim 10, wherein the operations comprise determining that the second utilization is less than the first utilization resulting in a first determination, wherein the generating of the second virtualized instance comprises generating the second virtualized instance based on the first determination.

12. The non-transitory, machine-readable medium of claim 11, wherein the providing of the instructions to operate the second group of virtualized applications on the second virtualized instance on the second edge network device comprises providing the instructions to operate the second group of virtualized applications on the second virtualized instance on the second edge network device based on the first determination.

13. The non-transitory, machine-readable medium of claim 10, wherein the first edge network device is associated with a first base station, wherein the first base station is associated with a first coverage area, wherein the second edge network device is associated with a second base station, wherein the second base station is associated with a second coverage area.

14. The non-transitory, machine-readable medium of claim 13, wherein the operations comprise determining that the mobile device has moved from the first coverage area into the second coverage area resulting in a second determination, wherein the providing of the instructions to operate the second group of virtualized applications on the second virtualized instance on the second edge network device comprises providing the instructions to operate the second group of virtualized applications on the second virtualized instance on the second edge network device based on the second determination.

15. The non-transitory, machine-readable medium of claim 13, wherein the operations comprise determining that the mobile device is located in both the first coverage area and the second coverage area resulting in a third determination, wherein the providing of the instructions to operate the second group of virtualized applications on the second virtualized instance on the second edge network device comprises providing the instructions to operate the second group of virtualized applications on the second virtualized instance on the second edge network device based on the third determination.

16. The non-transitory, machine-readable medium of claim 10, wherein the operations comprise obtaining information from the mobile device to determine a location of the mobile device.

17. The non-transitory, machine-readable medium of claim 16, wherein the information comprises one of sensor information, location information, accelerometer information, or a combination thereof.

18. A method, comprising:
- determining, by a processing system including a processor, that a mobile device is communicatively coupled to a first edge network device and determining that the mobile device is communicatively coupled to a second edge network device;
- identifying, by the processing system, a group of applications running on the mobile device;
- generating, by the processing system, a first virtualized instance including a first group of virtualized applications associated with the group of applications on the first edge network device in response to determining, by the processing system, that a first location of the mobile device is associated with the first edge network device;
- providing, by the processing system, instructions to operate the first group of virtualized applications on the first virtualized instance on the first edge network device;
- generating, by the processing system, a second virtualized instance including a second group of virtualized applications associated with the group of applications on the second edge network device in response to determining, by the processing system, that a second location of the mobile device is associated with the second edge network device; and
- providing, by the processing system, instructions to operate the second group of virtualized applications on the second virtualized instance on the second edge network device.

19. The method of claim 18, wherein the first location is associated with a first coverage area of a first base station, wherein the second location is associated with a second coverage area of a second base station.

20. The method of claim 18, wherein the first location is associated with a third base station, wherein the second location is associated with the third base station and a fourth base station.

* * * * *